United States Patent [19]

McMurtry

[11] Patent Number: 5,212,873
[45] Date of Patent: May 25, 1993

[54] POSITION-SENSING PROBE

[75] Inventor: David R. McMurtry, Wotton-Under-Edge, United Kingdom

[73] Assignee: Renishaw plc, Gloucestershire, England

[21] Appl. No.: 643,373

[22] Filed: Jan. 22, 1991

[30] Foreign Application Priority Data

Jan. 25, 1990 [GB] United Kingdom ............... 9001682

[51] Int. Cl.⁵ .................................................. G01B 5/20
[52] U.S. Cl. ......................................... 33/559; 33/561; 33/558
[58] Field of Search ................. 33/556, 558, 559, 560, 33/561

[56] References Cited

U.S. PATENT DOCUMENTS

| | | |
|---|---|---|
| 3,869,799 | 3/1975 | Neuer et al. . |
| 4,084,323 | 4/1978 | McMurtry . |
| 4,158,919 | 6/1979 | McMurtry . |
| 4,523,382 | 6/1985 | Werner et al. ............... 33/561 |
| 4,523,383 | 6/1985 | Rogers et al. . |
| 4,530,159 | 7/1985 | Ernst ............................. 33/559 |
| 4,578,873 | 4/1986 | Klingler et al. ............... 33/556 |
| 4,899,456 | 2/1990 | Morita et al. ................ 33/559 |
| 4,942,671 | 7/1990 | Enderle et al. .............. 33/559 |

FOREIGN PATENT DOCUMENTS

| | | |
|---|---|---|
| 0284737 | 10/1988 | European Pat. Off. . |
| 0422530 | 4/1991 | European Pat. Off. . |
| 3234471 | 8/1983 | Fed. Rep. of Germany . |
| 2112139 | 7/1983 | United Kingdom . |
| 2163256 | 2/1986 | United Kingdom . |
| 8400605 | 2/1984 | World Int. Prop. O. . |
| 9004149 | 4/1990 | World Int. Prop. O. . |

Primary Examiner—Thomas B. Will
Attorney, Agent, or Firm—Oliff & Berridge

[57] ABSTRACT

A probe for use on a coordinate positioning machine has a stylus supporting assembly (15), which supports a stylus (14) for three dimensional movement relative to the probe housing (10). The stylus supporting assembly (15) comprises a first member (16) mounted on the housing (10) and having a first plane surface (18). A second member (20) has a second plane surface (22) which is retained against the first plane surface (18) by magnets (24). The second member (20) may move in all directions in the XY plane relative to the first member (16) on an air bearing (26), and rotation of the second member (20) relative to the first member (16) is prevented by a spring bellows (30). The stylus (14) is fixedly connected to a third member (42) having plane surfaces (52A,B), which are retained against corresponding surfaces (50A,B) provided on the second member (20) by magnets (56), and for movement relative to the second member (20) in the Z direction on air bearings (48). The second and third members (20,42) may be provided in a light but stiff structure to lower the inertia of the stylus supporting assembly (15) and such a structure may for example be a honeycomb material. Movement of the stylus (14) in each of the X,Y,Z, directions is transduced by a series of transducers (62A,B;64A,B;66A,B).

19 Claims, 5 Drawing Sheets

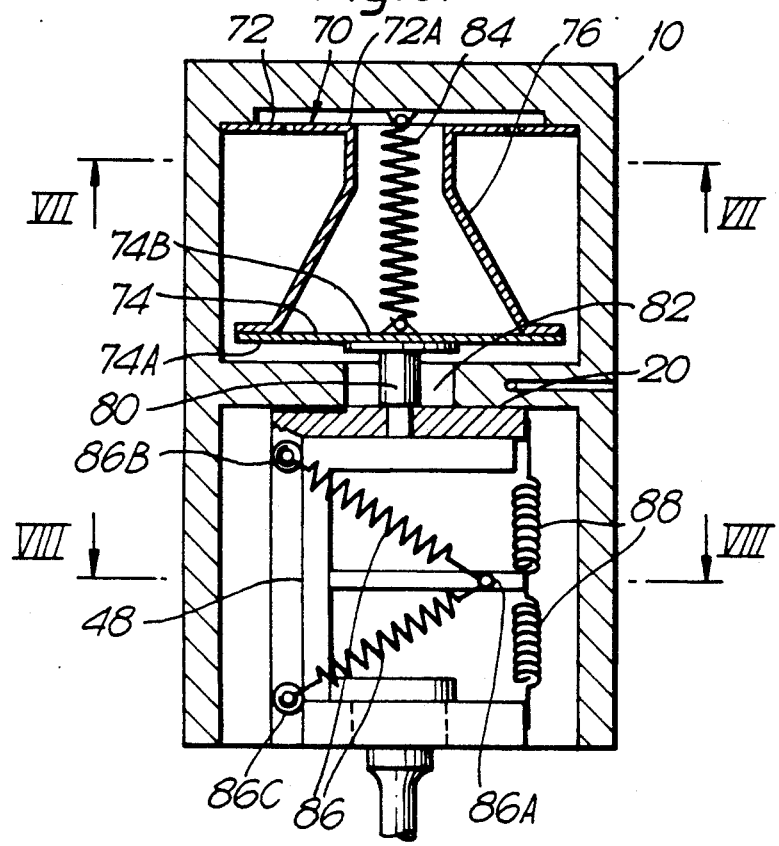
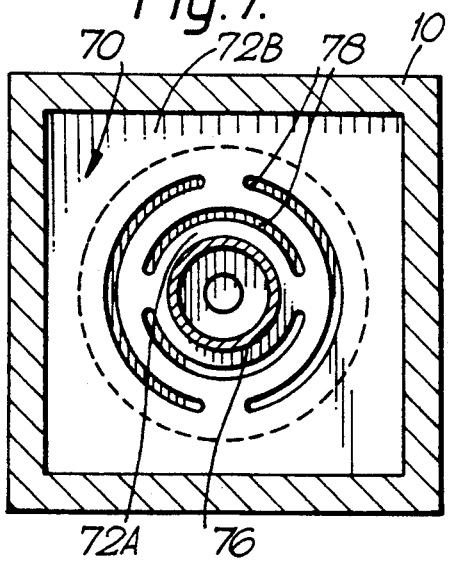
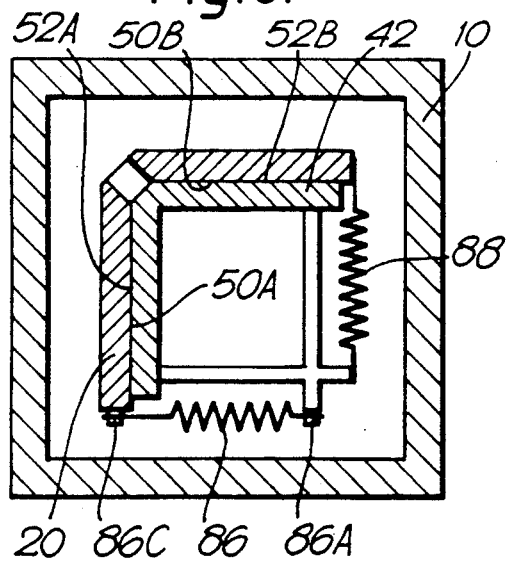

POSITION-SENSING PROBE

BACKGROUND TO THE INVENTION

1. Field of the Invention

This invention relates to a probe used for example on a coordinate positioning machine, to measure the position or contour of a surface.

Coordinate positioning machines are known to comprise a head supported for movement in mutually perpendicular directions relative to a support structure on which a workpiece is supportable, and means for measuring the position of the head relative to the support structure in the respective three dimensions. The probe typically comprises a stylus supported on a support assembly for movement from a rest position in three mutually perpendicular directions, and means for measuring the position of the stylus relative to the head in the respective three directions.

In use the probe is secured to the head of the machine and, in a typical operation, the head is moved to a predetermined position in which a stylus secured to the support assembly engages a point on the workpiece in such a way that the stylus is displaced relative to the head. Then the sum of the outputs of the respective measuring means defines the position of the stylus at that point relative to the support structure of the machine. The dimensions of the workpiece are derivable from the sums pertaining to a plurality of such points.

2. Description of Related Art

It is known (e.g. from U.S. Pat. No. 4,084,323) to provide a measuring probe having a support assembly for a stylus comprising three serially mounted, mutually orthogonal pairs of planar springs. This provides a friction-free mount for the stylus, but has the disadvantage that the springs are only parallel acting over a comparatively short range. A probe is also known, (e.g. from WO 90/04149) in which a stylus is supported on three serially mounted, mutually orthogonal pairs of cylindrical linear bearings. This provides a large range of stylus movement, but suffers from problems of a high inertia (due to the relatively high mass of the bearings) and hysteresis due to friction in the bearings.

SUMMARY OF THE INVENTION

A first aspect of the present invention provides a probe for use on a coordinate positioning machine, in measuring the position or contour of a surface, the probe having a fixed structure by which the probe is connectable to a head of the machine and a stylus supporting assembly for supporting a stylus for movement relative to the fixed structure, the assembly comprising:

a first member having a first plane surface;

a second member having a second plane surface, the second plane surface being retained against and moveable relative to the first plane surface in all directions in the plane of the first plane surface on bearing means, the stylus being connectable to the second member for movement with the second member in said plane; and means for restraining rotation of the second plane surface relative to the first plane surface.

Preferably the first member will be provided on the fixed structure.

In one embodiment of the present invention a third member to which a stylus is connectable may be provided, wherein the third member is constrained to move with the second member in said plane, but is free to move perpendicular to the second member thus providing 3 dimensional movement of the stylus.

A second aspect of the present invention provides a probe for use on a coordinate positioning machine in measuring the position or contours of a surface comprising a fixed structure, by which the probe is connectable to a head of the machine, and a member for supporting a stylus moveable in 2-dimensions relative to the fixed structure, the probe further comprising transducer means for transducing movement of said moveable member in two perpendicular directions, said transducer means comprising a pair of scales provided on one of the fixed structure and the moveable member having lines extending in mutually perpendicular directions, and means provided on the other of the fixed structure and the moveable member for reading each of said scales in a direction perpendicular to the lines of each said scale, thereby to determine said displacement of said second member.

BRIEF DESCRIPTION OF DRAWINGS

Embodiments of the invention will now be described by way of example, and with reference to the accompanying drawings wherein:

FIG. 6 is a view similar to FIG. 1 but shows a modification.

FIG. 7 is a section on the line VII—VII in FIG. 6.

FIG. 8 is a section on the line VIII—VIII in FIG. 6; and

DESCRIPTION OF PREFERRED EMBODIMENTS

Figure 4:
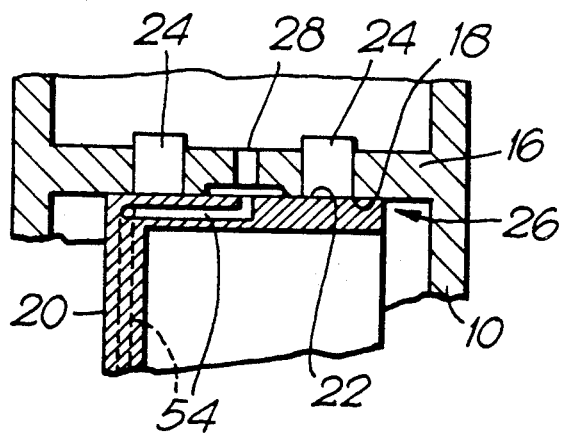
FIG. 4 is a section on the line IV—IV in FIG. 2.

The probe generally denoted 10, is described with reference to mutually perpendicular directions X,Y,Z. The probe has a fixed structure, provided by a housing 10, and connectable to the head 12 of a machine. A stylus 14, is supported by an assembly 15 which permits movement of the stylus relative to the housing 10 in each of the X, Y and Z directions. Specifically, the stylus-supporting assembly 15 comprises a first member 16, fixedly connected to housing 10, and having a plane surface 18 extending in the XY plane. A second member 20, having a plane surface 22, is retained against the first member 16 by a pair of Samarium Cobalt magnets 24 which act either on the second member (if it is of ferromagnetic material) or on ferromagnetic elements on the second member 20. The second member 20 is supported for motion relative the first member in all directions in the XY plane by means of an air bearing 26 (FIG. 4) formed between the adjacent plane surfaces 18 and 22 of the first and second members 16 and 20. The air bearing is fed with compressed air through a supply duct 28. Further, the second member 20 is supported against rotation relative to the first member 16 by a spring bellows 30 (FIG. 1) connected between the second member 20 and a flange 32 provided on the housing 10. The bellows 30 may also be used to bias the second member 20 against, and into a rest position relative to (with respect to the X and Y directions), the first member 16. To this end the bellows 30 may supplied with compressed air via a duct 34. Bias into the rest position of the second member is also assisted by tension springs 36 connected between a post 38 secured to the second member 20 and posts 40 on the first member 16.

Figure 3:
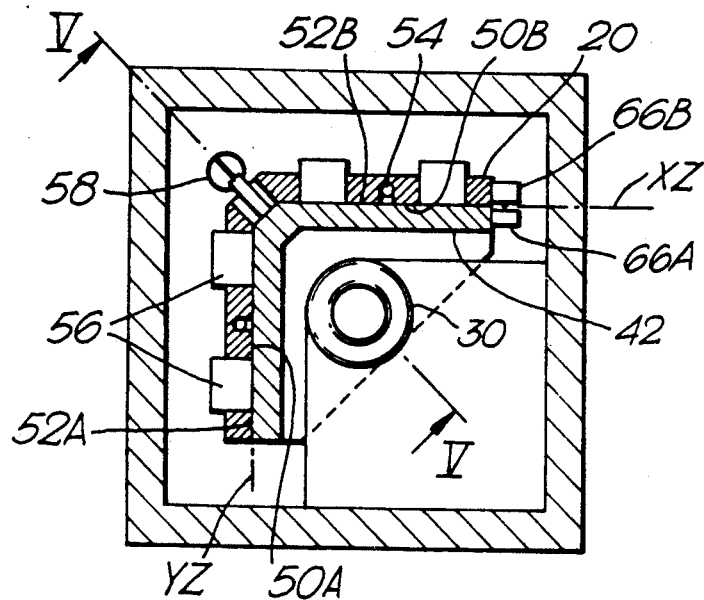
FIG. 3 is a section on the line III—III in FIG. 1.
Figure 5:
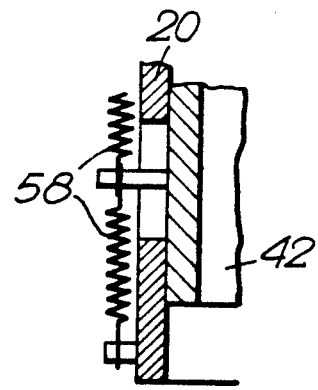
FIG. 5 is a section on the line V—V in FIG. 3.

The second member 20 is adapted to support a third member 42 (to which the stylus is connectable) for movement in the Z direction by an air bearing 48 formed between adjacent plane surfaces 50A,B and 52A,B of the second and third members 20,42. The air bearing 48 is fed with compressed air through channels 54, provided in the body of the second member 20 and connected to the bearing 26 The bearings and 48 are thus supplied from the same duct 28. This arrangement obviates the need for, example for air-pipe connections between the housing 10 and second member 20 which due to their stiffness would restrict movement of the second member 20. The surfaces 52A,B of the third member 42 are held against the surfaces 50A,B of the second member 20 by Samarium Cobalt magnets 56 located in the second member 20, and the third member 42 is supported against rotation about the Z direction by the surfaces 50A and 52A being arranged to extend in an XZ plane and the surfaces 50B and 52B to extend in a YZ plane as shown in FIG. 3. The third member 42 is biased into a rest position with respect to the Z direction by a pair of opposing springs 58 (FIGS. 3,5) connected between the members 20 and 42. The third member 42 is adapted to have the stylus 14 secured thereto.

In operation, the head 12 is moved relative to the workpiece so as to engage the free end of the stylus 14 with a workpiece 60 and displace the stylus 14 from its rest position by an amount within the range of movement of the members 20,42 relative to the members 16,20, respectively. The displacement of the stylus 14 from its rest position in the X,Y or Z directions is measurable by opto-electronic transducers 62,64,66, respectively. The transducer 62 comprises a scale 62A and a read head 62B mounted respectively on the members 20 and 16. The transducer 64 has a correspondingly mounted scale 64A and read head 64B wherein the lines of the scale 62A are spaced in the X direction while the lines of the scale 64A are spaced in the Y direction for measuring of the stylus displacement in these two directions. The transducer 66 has a scale 66A and a read head 66B mounted respectively on the members 42 and 20 for measuring displacement of stylus 14 in the Z-direction.

Figure 1:
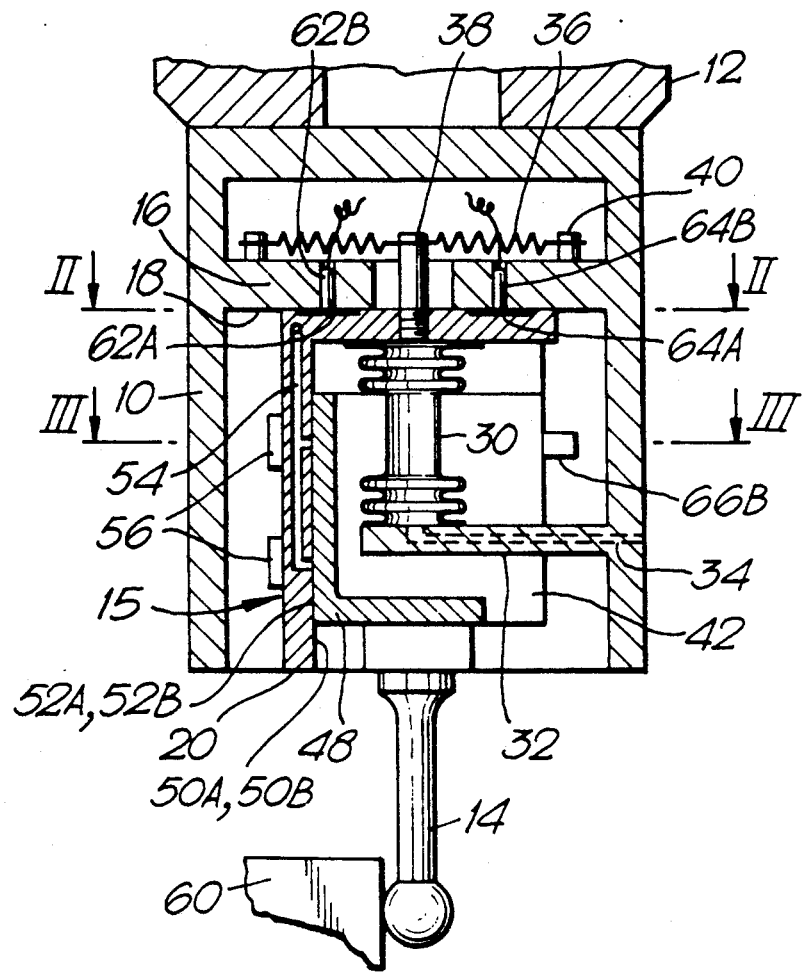
FIG. 1 is a sectional elevation of the probe.
Figure 2:
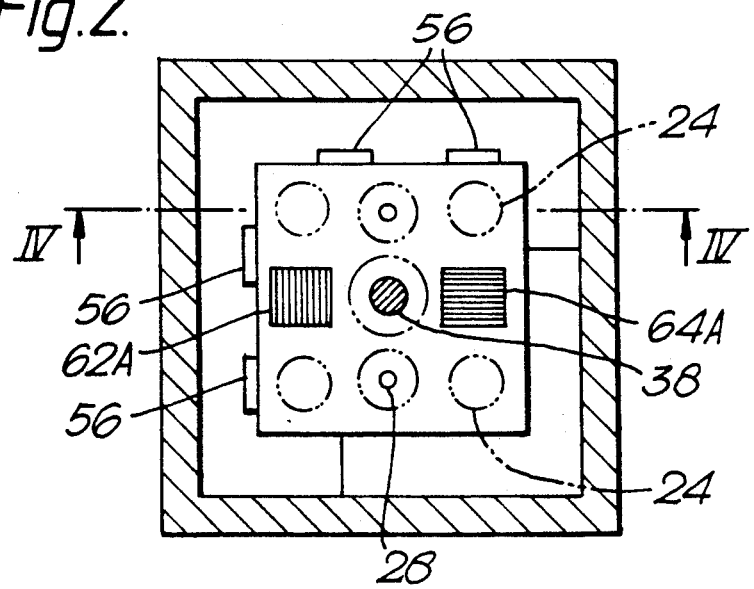
FIG. 2 is a section on the line II—II in FIG. 1.

In a modification (FIGS. 6,7 and 8) the bellows 30 of FIG. 1 is replaced by a spring device 70 comprising a pair of planar springs 72,74 secured to the respective ends of a frusto-conical tube 76. The spring 72 (FIG. 7) is made of resilient sheet material and has slots 78 so arranged that an inner part 72A of the spring 72, (being the part secured to the tube 76), is capable of universal pivotal motion (in a manner akin to a gimbal) relative to an outer part 72B of the spring 72, the outer part being secured to the housing 10. The spring 74 has generally the same construction as the spring 72 including inner and outer parts 74A,74B but in this case the outer part 74B is secured to the adjacent end of the tube 76 while the inner part 74A is secured to a post 80 on the member 20 extending through a clearance hole 82 in the member 16. The springs 72,74 thus perform the function of opposing rotation of first member 26 while allowing translation thereof in the X and Y directions.

Further the magnets 24 of FIGS. 1 to 4 are replaced by a tension spring 84 extending within the tube 76 and connected between the members 16,20 so as to urge the surfaces of the air bearing 26 into engagement in opposition to the air pressure in this bearing. The spring device 70 and the spring 84 also co-operate to bias the member 20 into a central rest position in the XY plane.

Regarding the member 42, the magnets 56 of FIGS. 1 to 4 are replaced by a pair of springs 86 and a pair of springs 88, all connected between the members 20,42 so as to urge the surfaces 50A,B and 52A,B of the air bearings 48 into engagement in opposition to the air pressure in this bearing. The springs of the pair 86 may be arranged between a common point 86A on the member 42 and spaced apart points 86B,86C on the member 20 so that the force of these springs has a component in the X direction to react the air pressure in this bearing 48 and a component in the Z direction such that the two springs co-operate to bias the member 42 into a rest position in respect of the Z-direction. The springs 88 are arranged in the same way as the springs 86

Figure 9:
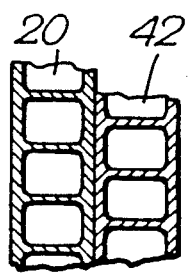
FIG. 9 is an enlarged sectional detail of FIG. 1.

From the point of view of the control system of the machine, it is desirable that the masses of the second and third members 20,42 should be low and that the masses that need to be moved in any of the three dimensions should be as nearly as possible the same. It will be seen that, in the probe illustrated, the masses to be moved in the X and Y directions are the same, i.e. are constituted by the members 20 and 42. Regarding the Z direction, which involves only the member 42, the mass of this member is necessarily less than that of the combined masses of both the members 20,42 involved in the X,Y motion. However, the member 20 may be made of a lighter material than the member 42 so that the combined mass of the members 20, 42 is not substantially greater than the mass of the member 42. Alternatively, both members 20,42 may be made of very light material so that their combined or separate masses do not show a substantial difference as far as the control system of the machine is concerned. An example of a light material is the honeycomb material shown in FIG. 9 which provides a light but stiff structure. Such material is preferably made of steel or other material (e.g. ceramics) having the ability to provide the hard and smooth surface finish necessary for the air bearings.

The air bearings 26,48 represent a means for virtually frictionless support for the movable parts 20,42. As shown at 28 in FIG. 4, the entry of the compressed air into the bearings 26,48 is via the first member 16 so that no tubes are necessary between relatively movable parts and hysteresis due to such tubes is avoided. As an alternative to the air supply being brought to the bearings 26,48 via ducts 28 and 54 respectively the supply may be provided, via the bellows 30 (the air being fed to the bearings 26,48 from the upper or movable end of the bellows 30).

As shown in FIG. 1, the read heads are mounted on the first member 16 so that no cables are necessary between the relatively movable first and second members 16,20. In the example illustrated, the read head 66B (FIGS. 1,3) is mounted on the second member 20 but any cables to this read head can be brought away from the member 20 via the post 38 and the springs 36.

Figure 1A:
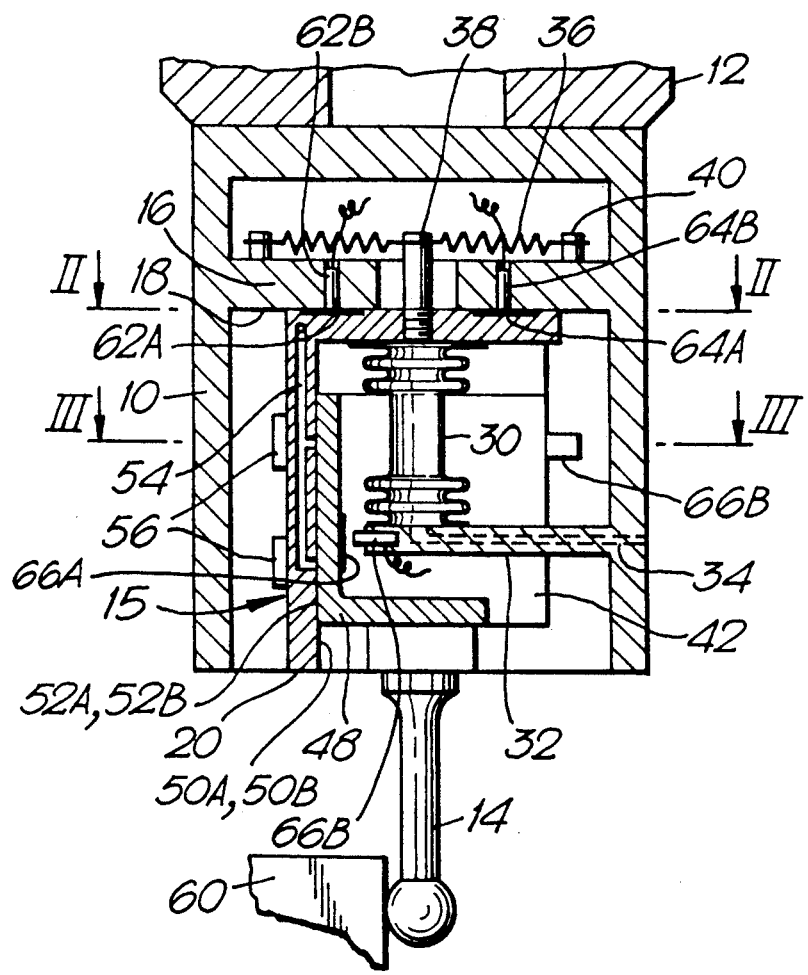
FIG. 1A is a sectional elevation of the probe showing an alternative placement of a sensor element.

It is however possible, to mount all three transducer read heads on the housing 10, by providing the scale 66A on the interior of third member 42, and read head 66B in register with the scale on the end of flange 32 (FIG. 1A).

The bearings 26 and 48 are shown as air bearings, preferred because of the exceedingly low friction afforded by such bearings. The bearings may however be provided by other means such as, for example, oil bearings, thin layers of PTFE on the surfaces 18 and 22 (such layers should be sufficiently stiff to retain a desired degree of stiffness between the surfaces 18 and 22), or ball bearings provided between the surfaces 18 and 22. Where ball bearings are used the balls may be either free standing, with e.g. a diaphragm provided at the edges of the surfaces 18 and 22, or trapped in a cage.

In the illustrated embodiments, the first member 16 is fixedly connected to the housing 10, and Z-axis movement of the stylus is provided by the third member 42 being moveable relative to the second member 20 in the Z direction. It is however possible to mount the first member for movement relative to the housing 10 (in e.g. the X direction) for example in a manner similar to the mounting of the third member 42 on the second member 20. In this case, the first plane surface 18 of the first member 16 would extend in the YZ plane and the second member 20 would be free to move relative to the first member 16 in all directions in this plane.

I claim:

1. A measuring probe for use on a coordinate positioning machine, the probe having a fixed structure by which the probe may be supported on a movable arm of the machine, and relative to which a workpiece contacting stylus is movably supported by a support assembly comprising:
    a first movable member retained against, and movable in at least a first direction relative to a support member provided on and fixed relative to, the fixed structure;
    a second movable member retained on the first movable member for movement therewith in said first direction and supported thereon for movement relative to the first movable member in a second direction transverse to said first direction, the stylus being connectable to the second movable member for movement therewith in said first and second directions;
    air bearing means for enabling said movement of said second movable member relative to said first movable member in said second direction, wherein air for said air bearing means is supplied from a duct on the support member via at least one air pathway provided on said first movable member.

2. A measuring probe according to claim 1, wherein said at least one pathway is provided by at least one channel in the body of the first movable member.

3. A measuring probe according to claim 1, wherein said first movable member is movable relative to said supporting member on further air bearing means, said further air bearing means being supplied with air from said duct on the fixed structure.

4. A measuring probe according to claim 3, wherein air passes sequentially from said further air bearing means and along said at least one pathway to said first-mentioned air bearing means.

5. A measuring probe according to claim 1, wherein biasing means are provided for yieldably biasing said first movable member against said support member and said second movable member against said first movable member.

6. A measuring probe according to claim 5, wherein said biasing means for biasing at least said first movable member against said support member is provided by at least one spring.

7. A measuring probe according to claim 5, wherein said biasing means for biasing at least said first movable member against said support member comprises means for producing a magnetic force provided on one of the first movable member and support, and at least one ferromagnetic element provided on the other of the first movable member and support.

8. A measuring probe according to claim 1, further comprising transducing means for measuring displacement of said stylus in said first and second directions, comprising first and second transducer member provided on said support assembly for movement with said stylus in said first and second directions respectively, and first and second sensors provided on the fixed structure for sensing said movement of said first and second transducer members.

9. A measuring probe according to claim 8, wherein each said transducer member is provided by a scale and each said sensor is provided by a read head.

10. A measuring probe according to claim 1, wherein said support surface is a plane surface and said first movable member is movable relative to said support surface in all directions in said plane.

11. A measuring probe according to claim 10, wherein means are provided for preventing rotation of said first movable member relative to said support member.

12. A measuring probe according to claim 3, wherein biasing means are provided for yieldably biasing said first movable member against said support member and said second movable member against said first movable member.

13. A measuring probe according to claim 12, wherein said biasing means for biasing at least said first movable member against said support member is provided by at least one spring.

14. A measuring probe according to claim 12, wherein said biasing means for biasing at least said first movable member against said support member comprises means for producing a magnetic force provided on one of the first movable member and support, and at least one ferromagnetic element provided on the other of the first movable member and support.

15. A measuring probe for use on a coordinate positioning machine, the probe having a fixed structure by which the probe may be supported on a movable arm of the machine, and relative to which a workpiece contacting stylus is movably supported by:
    a first movable member retained against, and movable in at least a first direction relative to a supporting member provided on the fixed structure;
    a second movable member retained against the first movable member for movement therewith in said first direction and supported thereon for movement relative to the first movable member in a second direction transverse to said first direction, the stylus being connectable to the second movable member for movement therewith in said first and second directions; and
    first and second air bearing means, interposed between said first movable member and said support member, and said second movable member and said first movable member respectively, for enabling said movement of said first movable member relative to said support member and said second movable member relative to said first movable member, wherein biasing means are provided for yieldably biasing said first movable member against said first support member and said second movable member against said first movable member in opposition to air pressure in said first and second air bearing means.

16. A measuring probe according to claim 15, wherein said biasing means for biasing at least said first movable member against said support member is provided by at least one spring.

17. A measuring probe according to claim 15, wherein said biasing means for biasing at least said first movable member against said support member comprises means for producing a magnetic force provided on one of the first movable member and support, and at least one ferromagnetic element provided on the other of the first movable member and support.

18. A measuring probe according to claim 15, further comprising transducing means for measuring displacement of said stylus in said first and second directions comprising first and second transducer members provided on said support assembly for movement with said stylus in said first and second directions respectively, and first and second sensors provided on the fixed structure for sensing said movement of said first and second transducer members.

19. A measuring probe according to claim 18, wherein each said transducer member is provided by a scale, and each said sensor is provided by a read head.

* * * * *